SINGLE SIDE BAND SUPPRESSED CARRIER MODULATOR

Filed Aug. 9, 1965 2 Sheets-Sheet 1

INVENTOR
WINSTON G. WALKER.
By White & Haefliger
ATTORNEYS.

SINGLE SIDE BAND SUPPRESSED CARRIER MODULATOR
Filed Aug. 9, 1965 2 Sheets-Sheet 2
FIG. 4.
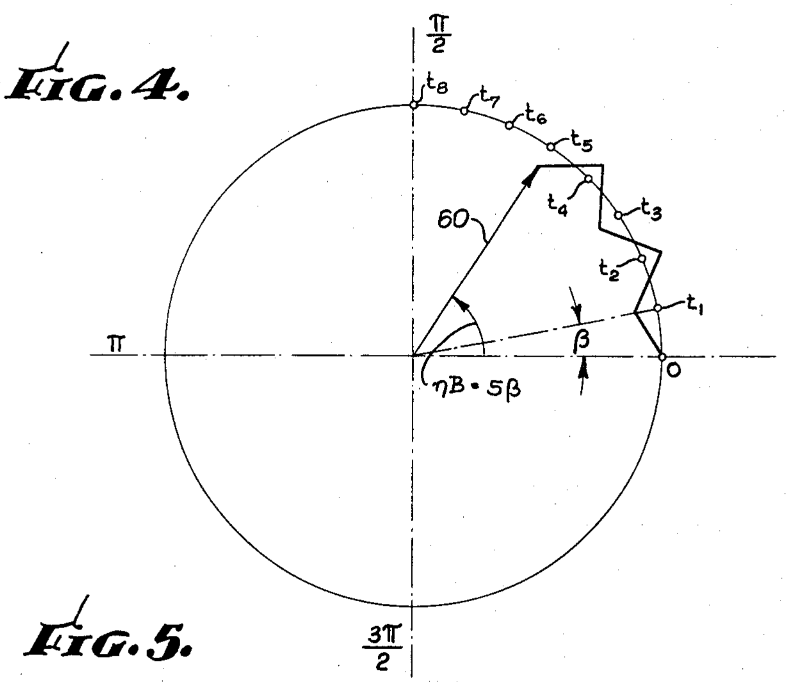
FIG. 5.
| VECTOR 60 POSITIONS | SECONDARY SWITCHES OPEN | SECONDARY SWITCHES CLOSED |
|---|---|---|
| $t_0$ | 54, 55, 56 | 51, 52, 53 |
| $t_1$ | 55, 56 | 51, 52, 53, 54 |
| $t_2$ | 51, 54, 56 | 52, 53, 55 |
| $t_3$ | 51, 56 | 52, 53, 54, 55 |
| $t_4$ | 51, 54 | 52, 53, 55, 56 |
| $t_5$ | 53, 54 | 51, 52, 55, 56 |
| $t_6$ | 51, 53, 54 | 52, 55, 56 |
| $t_7$ | 52, 53 | 51, 54, 55, 56 |
| $t_8$ | 51, 52, 53 | 54, 55, 56 |
FIG. 6.
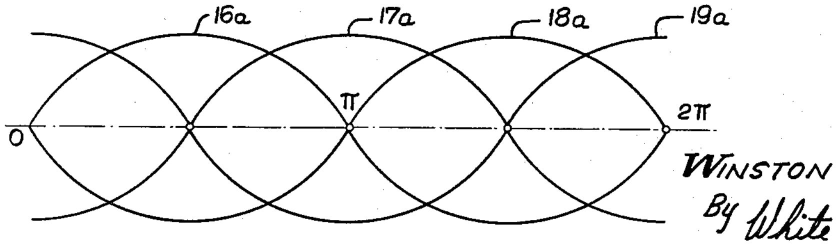
INVENTOR.
WINSTON G. WALKER
By White & Haefliger
ATTORNEYS.

3,411,110
SINGLE SIDE BAND SUPPRESSED CARRIER MODULATOR

Winston G. Walker, Santa Ana, Calif., assignor to Astrodata, Inc., Anaheim, Calif., a corporation of California Filed Aug. 9, 1965, Ser. No. 478,157
7 Claims. (Cl. 332—44)

ABSTRACT OF THE DISCLOSURE

The disclosure concerns accurately controlling or shifting the phase of a high frequency signal such as a carrier, in such manner as to produce what may be characterized as single side band suppressed carrier modulation, or a "vernier" controlled carrier frequency.

This invention relates generally to phase modulation apparatus, and more specifically has to do with accurately controlling or shifting the phase of a high frequency signal such as a carrier, in such manner as to produce what may be characterized as single side band suppressed carrier modulation, and also a "vernier" controlled carrier frequency.

While there have been in the past many different types of equipment for producing SSB (single side band) for transmission, none of the prior systems of which I am aware have exhibited the unusually advantageous features of construction, mode and operation and results characterizing the present invention. Among these are the extremely accurate and close control of the carrier or clock frequency.

Basically, the apparatus comprises phase shifting means responsive to a received carrier signal to produce multiple output signals that are respectively phase displaced so as to cancel if added, the output signals having the same frequency, together with means connected to be responsive to a modulation signal for selectively passing and variably amplitude modulating different of the output signals, and thereafter combining the amplitude modulated signals to produce a modulated side band for transmission. Typically, a limiter is connected to limit the output side band signal as will be described.

More specifically, the multiple output signals are phase displaced at approximately 90 degree intervals; the means to selectively pass and amplitude modulate the multiple output signals includes a network having parallel resistors and parallel switches connected in banks as will appear; and switch control means is provided to be responsive to the modulating signal to operate the switches in controlled sequence or pattern, as will be further explained.

These and other objects and advantages of the invention, as well as the details of illustrative embodiments, will be more fully understood from the following detailed description of the drawings in which:

FIG. 4 illustrates a phase diagram showing division of the modulating signal into angular increments corresponding to variable control of the switches;

FIG. 5 is a tabulation correlating the FIG. 4 increments with switch closure; and FIG. 6 is a diagram showing four output signals produced from the carrier.

Figure 1:
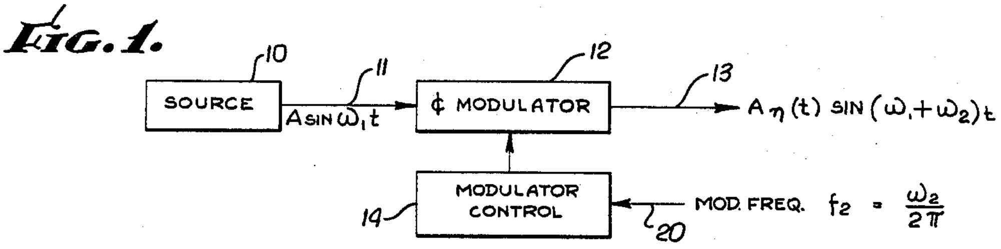
FIG. 1 is a functional block diagram showing the modulating function of the apparatus.

Referring first to FIG. 1, a carrier signal source is indicated generally at 10, and may for example include a crystal controlled oscillator or clock. The signal output from the source is indicated at 11, and may typically have generally sinusoidal wave form:

$$A \sin \omega_1 t \qquad (1)$$

the frequency of which may for example be in the megacycle range, and is defined as:

$$f_1=\frac{\omega_1}{2\pi} \qquad (2)$$

Signal 11 is passed to a phase modulator 12 which operates upon the input 11 to produce an output 13 which may typically have the form:

$$\sin (\omega_1+\omega_2)t \qquad (3)$$

the frequency of which is slightly different than $f_1$ and is defined as $$f^3=\frac{\omega_1+\omega_2}{2\pi} \qquad (4)$$

As an example, $f_1$ may be $10^6$ cycles per second whereas $f_3=10^6+1$ cycle per. second. In this regard, a modulator control 14 operates to control the modulator 12 in the manner to be later described, the control having at 20 an arbitrary input modulating frequency:

$$f_2=\frac{\omega_2}{2\pi} \qquad (5)$$

Figure 2:
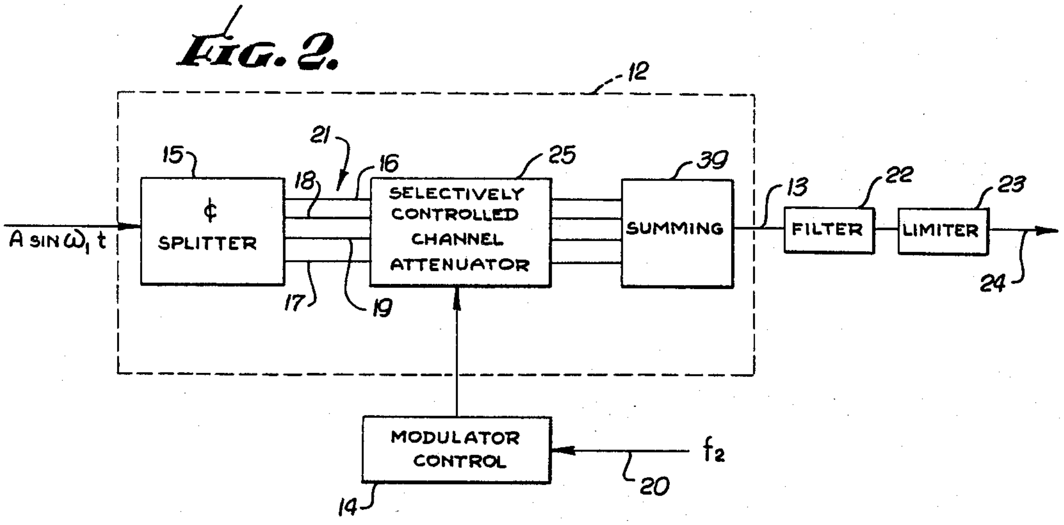
FIG. 2 is a more detailed showing of the block diagram components of the modulator, together with a filter and limiter.

In accordance with the invention, the modualtor 12 may be considered to include phase shifting or splitter means 15 responsive to a received carrier input signal 11 to produce multiple output signals of the same frequency but respectively phase displaced so as to cancel if added together. Such signals are transmitted by parallel channels generally indicated at 21, but specifically illustrated as channels 16–19 in FIGS. 2–3 for the case where the signals are phase displaced at 90 degree intervals. As to the latter, FIG. 6 shows four typical channel signals 16*a*, 17*a*, 18*a* and 19*a*, of sinusoidal form, although the invention contemplates numbers of channels other than four, and signal wave forms other than sinusoidal. Also, phase displacement of the signals may be other than 90 degrees.

Further in accordance with the invention, the modulator 12 and control 14 may be considered to include means connected to be responsive to the modulating signal of frequency $f_2$ for selectively passing and variably amplitude modulating different of the output signals transmitted by channels 21 and thereafter combining the amplitude modulated signals to produce a suppressed carrier, phase modulated, single side band signal for transmission at 13. That signal may be filtered at 22 to remove high frequency components introduced by the modulator switching, and limited at 23 to produce a single side band phase modulated square wave at output 24. One pole filter is shown, although filters of other configurations are contemplated.

Figure 3:
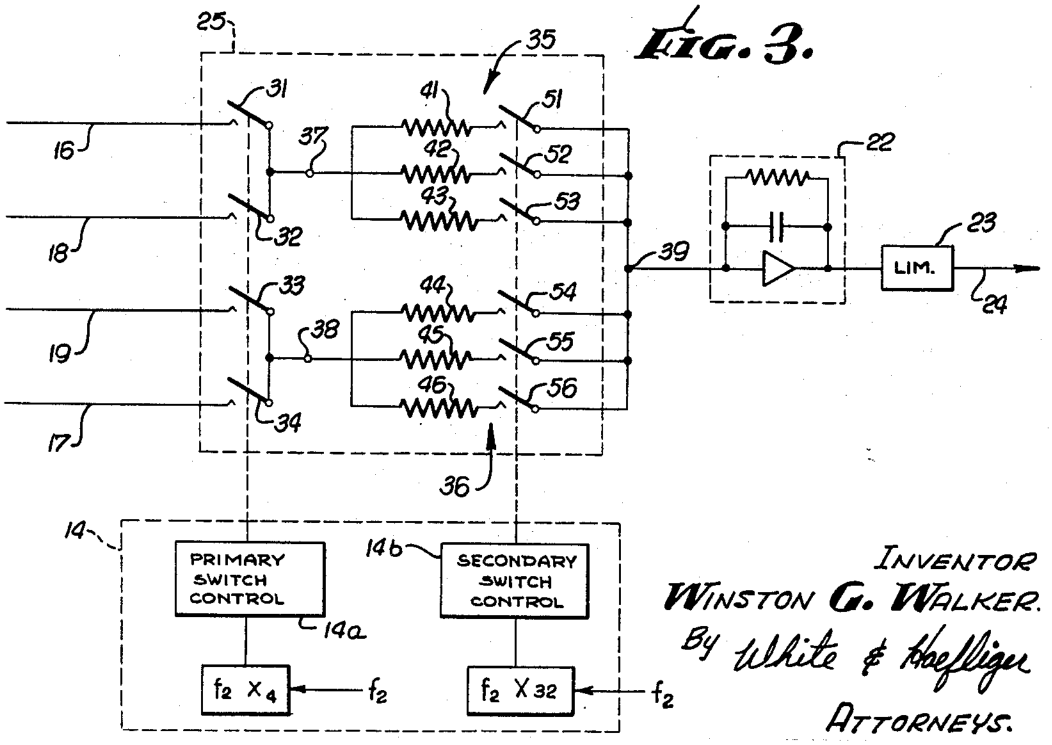
FIG. 3 illustrates circuit mechanization of the modulator using switches and resistors, and also illustrating a particular filter.

In the form of the invention illustrated, the above means last referred to includes an attenuator network 25 having parallel resistors and parallel switches connected to selectively pass and variably attenuate different of the signals transmitted via channels 21. For example, as seen in FIG. 3, there are parallel primary switches 31–34, and resistors and switches defining first and second parallel banks 35 and 36. Bank 35 includes three parallel branches with a common input terminal 37, and bank 36 has three parallel branches with a common input terminal 38. A summing junction 39 provides a common output terminal for the branches of both banks 35 and 36 in network 25. Each branch in the banks includes a resistor and a switch connected in series, the resistors being designated at 41–46, and the switches (called secondary switches) being indicated at 51–56.

The primary switches 31 and 32 are arranged to selectively connect and disconnect two of the phase shifter output signals, for example 16*a* and 18*a*, with the common input terminal 37 of bank 35, and primary switches 33 and 34 are arranged to selectively connect and disconnect two of the phase shifter output signals, for example 19*a* and 17*a* with the common input terminal 38 of bank 36. Switch control means 14*a* and 14*b* are responsive to the modulating signal $f_2$ to operate the primary switches 31–34 and secondary switches 51–56 respectively.

To better understand the operation of the FIG. 3 circuit, it will be understood that expression (3) above may be written as follows:

$$A_n(t)\ \sin\ (\omega_1+\omega_2)t_n=A_n(t)\ [\sin\ \omega_1 t_n\ \cos\ n\beta+\cos\ \omega_1 t_n\ \sin\ n\beta] \quad (6)$$

where, $A_n(t)$=amplitude of output at 13, which is a function of time, and is represented by the length of vector in FIG. 4

$$t_n=\frac{n}{Nf_2}$$

$\beta$=angle between arbitrary equal time intervals $t_1-t_0$, $t_2-t_1$, etc.

$$N=\frac{2\pi}{\beta}$$

$n\beta$=the angular displacement of modulating signal vector 60 at $t_n$ $$f_2=\frac{\omega_2}{N\beta}$$

In other words, looking at the right hand side of Equation 6, it is seen that the amount of the carrier component 16*a* designated as $A_n(t)$ sin $\omega_1 t$ to be included in the output at time $t_n$ is represented by the expression cos $n\beta$, and the amount of the carrier component 19*a* designated as $A_n(t)$ cos $\omega_1 t$ to be included in the output at time $t_n$ is represented by the expression sin $n\beta$.

Further, the desired phase modulation $\omega_2$ is seen to be derived by selective inclusion of the resistors 41–46 momentarily switched into signal passing and attenuating relation to the signals 16*a*–19*a*.

In FIG. 4, the modulating frequency $f_2$ is assumed for purposes of illustration to be one cycle per second, represented by the vector 60 sweeping counterclockwise through 360 degrees in one second. Various secondary switches of attenuator network 25 are operated by the control 14 at 1/32 second intervals, so that in the interval 0 to $\pi/2$ in FIG. 4 various of switches 51–56 of FIG. 3 will be operated at each of the vector angles represented by the times $t_0$, $t_1$ . . . $t_8$. Various of secondary switches 51–56 will also be operated at 1/32 second intervals as the vector 60 sweeps through the remaining quadrants of the FIG. 4 circle. On the other hand, the open or closed states of the primary switches of network 25 are tabulated as follows:

| Vector 60 position | Primary Switches Open | Primary Switches Closed |
|---|---|---|
| 0 to 90° | 32 and 34 | 31 and 33. |
| 90° to 180° | 31 and 34 | 32 and 33. |
| 180° to 270° | 31 and 33 | 32 and 34. |
| 270° to 360° | 32 and 33 | 31 and 34. |

Thus, switches 31–34 are variously operated each quarter second as vector 60 arrives at 90°, 180°, 270° and 360° positions. Also in FIGS. 3–5, the values of the resistors 41 to 46 are as follows, giving the proper weighting or attenuation in various combinations:

| | |
|---|---|
| Resistor 41 | 1 Unit of resistance. |
| Resistor 42 | 2 Unit of resistance. |
| Resistor 43 | 4 Unit of resistance. |
| Resistor 44 | 1 Unit of resistance. |
| Resistor 45 | 2 Unit of resistance. |
| Resistor 46 | 4 Unit of resistance. |

In FIG. 5 are tabulated the open or closed states of the secondary switches 51–56 at vector angular positions $t_0$ . . . $t_8$ in the first quadrant. Switch positions for corresponding vector positions in the remaining quadrants may be similarly determined. In general, $f_2$ may have any value, and the number of primary and secondary switches and resistors may be correlated to the selected time increment sampling of the phase split input signals.

Generally speaking, the value of the amplitude term A($t$) in Equation 6 will fluctuate somewhat in value due to the discretely incremental or digital type functioning of the attenuator 25 as various of the switches are operated at each of the vector time positions $t_0$ . . . $t_8$, etc. This fluctuation results in the "star" pattern traced by the tip of vector 60 in FIG. 4. Limiter 23 removes these amplitude fluctuations, leaving the square wave axis crossings as the phase modulation on the output signal. Low pass filter 22 is used to eliminate switching transients, i.e., it smooths the output.

The phase shifter network 15 is known in the art. Also, the switches 31–34 and 51–56 may be electronic, and may be suitably controlled at 14. Limiter 23 is standard, and the filter 22 may include a DC amplifier with feedback capacitance and resistance as indicated in FIG. 3.

I claim:

1. Apparatus of the character described, comprising means responsive to a received carrier signal to produce multiple output signals respectively phase displaced, said output signals having the same frequency, and means responsive to a modulating signal and connected to receive said output signals for selectively passing and variably summing different of said output signals to produce a resultant signal which is incrementally phase advanced or retarded in the same direction at a rate determined by said modulating signal, said multiple output signals being phase displaced at equal phase angle intervals and respectively supplied in a number of channels equal to the number of said intervals, and said last named means including a network having parallel resistors and parallel switches connected to selectively pass and variably sum different of said output signals.

2. Apparatus as defined in claim 1 including limiter means connected to clip the resultant signal.

3. Apparatus as defined in claim 1 including a source of said carrier signal, said carrier signal being of greater frequency than said modulating signal.

4. Apparatus as defined in claim 1, wherein said multiple output signals are phase displaced at 90 degree intervals and respectively supplied in four channels.

5. Apparatus as defined in claim 1 in which said last named means includes switch control means responsive to said modulating signal to operate the switches in controlled sequence.

6. Apparatus as defined in claim 5 in which said switches include primary and secondary switches, said resistors and secondary switches defining first and second parallel banks, each bank having parallel branches with common input and output terminals, each branch including a resistor and secondary switch connected in series, said primary switches arranged to selectively connect two of said output signals with the common input terminal of one bank and to selectively connect another two of said output signals with the common input terminal of the other bank.

7. Apparatus of the character described, comprising means responsive to a received carrier signal to produce multiple output signals, said output signals having the same frequency, means responsive to a modulating signal and connected to receive said output signals for selectively passing and variably amplitude modulating different of said output signals and thereafter combining the amplitude modulated signals to produce a phase modulated side band signal for transmission, said phase modulated signal being expressed as:

$$A_n(t)[\sin \omega_1 t_n \cos n\beta + \cos \omega_1 t_n \sin n\beta]$$

where $A_n(t)$=amplitude of phase modulated signal $$t_n = \frac{n}{Nf_2}$$

$\beta$=angle between arbitrary equal time intervals $t_1 - t_0$, $t_2 - t_1$, etc.

$$N = \frac{2\pi}{\beta}$$

$n\beta$=angular displacement of modulating signal at $t_n$ $$f_2 = \frac{\omega}{N\beta}$$

$\omega_1 = 2\pi$ times carrier signal frequency $\omega_2 = 2\pi$ times modulating signal frequency

References Cited

UNITED STATES PATENTS

| | | | |
|---|---|---|---|
| 2,976,363 | 3/1961 | Barton | 332—40 |
| 3,037,190 | 5/1962 | Herbst | 332—21 |

ROY LAKE, *Primary Examiner.*

L. J. DAHL, *Assistant Examiner.*